United States Patent
Fuchs

(10) Patent No.: US 10,543,855 B2
(45) Date of Patent: Jan. 28, 2020

(54) RAIL VEHICLE

(71) Applicant: Siemens Aktiengesellschaft, München (DE)

(72) Inventor: Andreas Fuchs, Erlangen (DE)

(73) Assignee: SIEMENS MOBILITY GMBH, München (DE)

( * ) Notice: Subject to any disclaimer, the term of this patent is extended or adjusted under 35 U.S.C. 154(b) by 0 days.

(21) Appl. No.: 16/079,442

(22) PCT Filed: Jan. 24, 2017

(86) PCT No.: PCT/EP2017/051390
§ 371 (c)(1),
(2) Date: Aug. 23, 2018

(87) PCT Pub. No.: WO2017/153078
PCT Pub. Date: Sep. 14, 2017

(65) Prior Publication Data
US 2019/0054931 A1 Feb. 21, 2019

(30) Foreign Application Priority Data
Mar. 8, 2016 (EP) .................................. 16159214

(51) Int. Cl.
*B61C 17/00* (2006.01)
*B60T 17/00* (2006.01)
(Continued)

(52) U.S. Cl.
CPC ............ *B61C 17/00* (2013.01); *B60T 17/004* (2013.01); *B61C 3/00* (2013.01); *B60L 2200/26* (2013.01); *B60L 2240/36* (2013.01); *B61H 13/34* (2013.01)

(58) Field of Classification Search
CPC .......... B61C 17/00; B61H 13/34; B60T 15/54; B60T 17/002; B60T 17/004; F16D 65/78;
(Continued)

(56) References Cited

U.S. PATENT DOCUMENTS 714,497 A * 11/1902 Mailloux ................. H02K 9/04
105/59
714,498 A * 11/1902 Mailloux ................. H02K 9/04
105/59
(Continued)

FOREIGN PATENT DOCUMENTS

DE 39 28 108 A1 2/1991
DE 2012 203 132 A1 8/2013
(Continued)

OTHER PUBLICATIONS

PCT International Search Report and Written Opinion of International Searching Authority dated May 22, 2017 corresponding to PCT International Application No. PCT/EP2017/051390 filed Jan. 24, 2017.

*Primary Examiner* — Zachary L Kuhfuss
(74) *Attorney, Agent, or Firm* — Henry M. Feiereisen LLC

(57) ABSTRACT

A rail vehicle includes an electric drive including a housing and power semiconductors arranged in the housing, and a braking system configured for operation with compressed air. The housing and the braking system are interconnected such as to enable supply of compressed air from the braking system to an interior of the housing. A depressurization device is arranged between the housing and the braking system such as to enable compressed air which is supplied to the housing to be depressurized prior to being supplied to the interior of the housing.

10 Claims, 3 Drawing Sheets

(51) Int. Cl.
*B61C 3/00* (2006.01)
*B61H 13/34* (2006.01)

(58) Field of Classification Search
CPC ............. F16D 65/782; F16D 2065/782; B60L 2200/26; B60L 2240/36
See application file for complete search history.

(56) References Cited

U.S. PATENT DOCUMENTS

| | | | |
|---|---|---|---|
| 5,549,174 A * | 8/1996 | Reis | B60K 6/12 |
| | | | 180/165 |
| 6,456,909 B1 | 9/2002 | Shimada et al. | |
| 8,281,908 B2 * | 10/2012 | Hudson | F16D 65/78 |
| | | | 188/264 D |
| 8,490,760 B2 * | 7/2013 | Hudson | F16D 65/78 |
| | | | 188/264 F |
| 9,393,969 B1 * | 7/2016 | Wright | B61C 5/02 |
| 9,592,739 B2 * | 3/2017 | Fujito | H02P 27/06 |
| 9,707,951 B2 * | 7/2017 | Foerster | B60T 17/228 |
| 2014/0345492 A1 * | 11/2014 | Fujito | H02P 27/06 |
| | | | 105/61 |
| 2015/0032302 A1 | 1/2015 | Foerster et al. | |
| 2017/0282883 A1 | 10/2017 | Fuchs | |
| 2019/0039589 A1 * | 2/2019 | Becker | B61D 27/00 |
| 2019/0054931 A1 * | 2/2019 | Fuchs | B60T 17/002 |

FOREIGN PATENT DOCUMENTS

| | | |
|---|---|---|
| DE | 2012 015 041 A1 | 5/2014 |
| EP | 2 992 944 A1 | 3/2016 |
| RU | 2192974 C2 | 11/2002 |

* cited by examiner

RAIL VEHICLE

CROSS-REFERENCES TO RELATED APPLICATIONS

This application is the U.S. National Stage of International Application No. PCT/EP2017/051390, filed Jan. 24, 2017, which designated the United States and has been published as International Publication No. WO 2017/153078 and which claims the priority of European Patent Application, Serial No. 16159214.2, filed Mar. 8, 2016, pursuant to 35 U.S.C. 119(a)-(d).

BACKGROUND OF THE INVENTION

The invention relates to a rail vehicle having an electric drive with power semiconductors and a braking system operated with compressed air, wherein the power semiconductors are arranged in a housing. The invention further relates to a method for operating such a rail vehicle.

Electrical, electronic or mechanical elements and components are sensitive to humidity in the ambient air. These elements are used in a multiplicity of devices. Thus, for example, printed circuit boards of electronic devices comprise electrical or electronic elements. Persistent humidity jeopardizes these elements, resulting in their failing more frequently than elements which are operated dry. This relates to all or at least almost all electronic components and devices comprising electrical, electronic or mechanical elements.

To increase availability and reliability, and to reduce the risk of failure of a rail vehicle, it is particularly important to operate the components of the electric drive of the rail vehicle in an environment which is as dry as possible.

A particular problem arises in applications operated in environments which are not air-conditioned or which are untempered. This is particularly the case for rail vehicles. The humidity present in this environment can result in condensation and thus humidity on the elements. Likewise, a fluctuation in temperature leads to the condensation of humidity from the air on the elements. This condensation reduces the service life of the elements, resulting in their failing more frequently or earlier than elements which are operated in a dry condition. Furthermore, corrosion caused by the humidity can hinder the safe and reliable operation of these components and the rail vehicles constructed using them. Safe and reliable operation is especially necessary for rail vehicles. A failure of the electric drive can result in elaborate and costly salvage measures. Even the failure of only parts of the electric drive leads to significant delays in some instances. Due to schedule-related dependencies of various trains, the failure of parts of a drive frequently results in disturbances throughout the integrated network of the rail vehicle operator.

In tropical countries, in particular, it has proven worthwhile to install such arrangements described above in relatively airtight cabinets and/or to include drying agents in these cabinets. The drying agent must then be replaced periodically. Depending on the ambient humidity, very short replacement times of a few days may occur. This adversely affects the availability of such systems because of the consequent short maintenance intervals. At the same time, maintenance costs for the operation of these systems increase.

A method for reducing the humidity in a housing wherein compressed air is depressurized in the housing is known from the still unpublished EP 14 183 340.0.

The object of the invention is to specify a rail vehicle having a higher reliability.

SUMMARY OF THE INVENTION

This object is achieved by a rail vehicle having an electric drive with power semiconductors and a braking system operated with compressed air, wherein the power semiconductors are arranged in a housing, wherein the rail vehicle has a depressurization device, wherein the housing and the braking system are interconnected such that the compressed air can be supplied from the braking system to the interior of the housing, wherein the depressurization device is arranged between housing and braking system such that the compressed air that can be supplied to the housing can be depressurized prior to being supplied to the interior of the housing. The object is further achieved by a method for operating such a rail vehicle, wherein the compressed air is supplied from the braking system to the interior of the housing, wherein the compressed air supplied to the housing is depressurized prior to being supplied to the interior of the housing by means of the depressurization device.

Further advantageous embodiments of the invention are specified in the dependent claims.

The invention is based on the knowledge that the humidity in a housing of a rail vehicle can be reduced by introducing depressurized compressed air. The term compressed air defines air which is taken from a compressed air system such as, for example, the braking system of the rail vehicle. This may, but need not have a higher pressure than the environment. A person skilled in the art understands depressurization to mean the reduction of the pressure of a gas while its volume is simultaneously increased. The humidity of the existing air is reduced by the depressurization of compressed air such that the relative humidity of the air decreases. Air in the housing with a higher proportion of humidity is replaced by the additional depressurized compressed air or the compressed air mixes with the existing air in the housing such that the humidity in the housing decreases. This dry air can absorb humidity from elements, in particular from power semiconductors, to thereby dry the element. This extends the service life of the component and reduces the likelihood of failure. Furthermore, or alternatively, the dry air in the housing prevents the condensation of humidity on the element. This reliably prevents the formation of creepage distances that lead to the formation of flashovers. In particular, condensation caused by temperature fluctuations in the environment can be reliably prevented by the method for reducing humidity. Besides electrical, electronic and mechanical components, the term elements also comprises insulation materials, for example, for acoustic and temperature insulation as well as sealants which by virtue of their nature can absorb moisture from the air. The housing with the power semiconductors may be tightly sealed to minimize the penetration of moist air. It has proven advantageous if the housing has an external interface with which the exchange of air from the housing to the environment can be regulated or controlled. This can take place, for example, by means of panels or flaps which are arranged in front of openings of the housing. It is thus possible, for example, to prevent the penetration of air, in particular of moist air, into the housing.

It has proven advantageous to expand the compressed air outside the housing. In the event of a fire in the housing there is thus no risk of damage to a valve controlling inflow and of the fire being uncontrollably supplied and supported with oxygen from the compressed air. For strict fire protection it has therefore proven advantageous to arrange a corresponding valve or a depressurization device outside the housing.

Furthermore, alternatively or additionally the housing can also be designed to be leak tight, in particular, pressure-tight to minimize the penetration of humid air. It has proven advantageous if the housing has an interface, for example in the form of an external relief valve with which the air pressure in the housing can be regulated or controlled. It is thus possible, for example, to generate a higher pressure inside the housing compared to the environment of the housing, which prevents the penetration of humid air from the environment in a simple manner.

Moreover, the interface for pressure regulation permits the introduction of large amounts of air without having a direct impact on the air pressure inside the housing. Thus, the amount of depressurized compressed air and the pressure in the housing are decoupled from each other. Furthermore, this method is particularly suitable for housings which are not hermetically sealed or are not pressure-tight. Such a housing can, for example, have openings for this purpose. The entry of air the humidity of which can or does lead to condensation on the elements, can be prevented by the introduction of the depressurized compressed air. Even if moist air penetrates from outside, this is mixed with the dry, depressurized compressed air such that the air then in the housing only has a low resulting relative humidity. The method results in the air containing less humidity and no condensation occurring on the elements, in particular on the power semiconductors, even when the temperature decreases. The depressurization of the compressed air can take place constantly, at certain times, for example periodically, or it can be event-driven. Event-driven control can depend on the relative humidity, the temperature or the fluctuation and/or change in temperature. Likewise, it is possible to measure the humidity in the housing and to supply compressed air to the housing when a limit value is exceeded. The process of depressurization can be controlled by way of a device for the depressurization of compressed air such as, for example, valves or nozzles. A controller or an adjustment can be provided to control the amount of air and/or the times which adjusts and/or controls the supply of dry air as a function of environmental parameters such as, for example, moisture content of the ambient air or the air in the interior of the housing, temperature, etc. In the method according to the invention, the compressed air can be advantageously removed from a pipe system, a pressure hose or a pressure accumulator such as, for example, a pressure reservoir of the braking system of the rail vehicle.

The braking system of a rail vehicle, in particular the compressed air of the braking system, is available throughout the rail vehicle. In addition to the main air line (ML or MAL for short) for connecting the brake devices of the rail vehicle, the braking system also comprises the main air reservoir line (MRL or MR for short) for supplying the driver brake valve or also partially for filling the air supply used by the braking system. Both the compressed air from the main air line and the compressed air from the main air reservoir line are suitable for performing the method according to the invention. In this way, the humidity in a housing can be reduced and/or components therein cooled at any point on the rail vehicle. Likewise, the condensation from humidity on one or more elements such as power semiconductors can be prevented thereby.

There are particular requirements for the compressed air of a braking system of a rail vehicle regarding the humidity therein, also called residual humidity. The compressed air in rail vehicles is therefore usually dried by a compressed air dryer such that the compressed air has a residual humidity of less than 35%. Drying is understood to mean the reduction of the humidity in the compressed air. In many applications requiring compressed air, drying already takes place immediately after compression. To this end, compressors are often already equipped with a corresponding drying device. With regard to the residual humidity in the compressed air of the braking system of a rail vehicle, there are specifications for air quality from the international ISO standard 8573 which requires a residual humidity of less than 35% in compressed air. This low humidity, also referred to as residual humidity, continues to fall significantly if the compressed air is depressurized to dry the elements. As a result of the availability of compressed air for the braking system of a rail vehicle and the strict prevailing requirements for air quality with a residual humidity of less than 35%, this compressed air is particularly suitable for supply to the housing with the power semiconductors.

In a further advantageous embodiment, the housing has means for guiding the compressed air which are arranged such that the compressed air flows at least partially along the power semiconductors, a heat sink of the power semiconductor and/or a busbar. In addition to a reduction in relative humidity, the depressurization of the compressed air results in a temperature reduction of this compressed air which is introduced into the housing after depressurization. This effect can be used to cool components in the interior of the housing, in particular to cool the power semiconductors or the busbar. The power semiconductors arranged in the housing such as, for example, the power semiconductors of the electric drive, can be cooled using this temperature reduction in the compressed air. Heat arises when operating power semiconductors, due to their inevitable electrical losses, which must be discharged to the environment. The temperature in the surroundings of the power semiconductor is reduced by introducing depressurized compressed air. This increases the performance of the power semiconductor. In other words, the depressurization device is arranged between housing and braking system such that the compressed air that can be supplied to the housing can be depressurized prior to being supplied to the interior of the housing so that the temperature of the depressurized compressed air supplied to the housing is lower than the temperature of the air in the housing. The cooling effect takes place, for example, by way of the surface of the power semiconductor or by way of a heat sink connected to the power semiconductor. Often such a heat sink, which is thermally connected to the power semiconductor, is provided for the removal of heat from the power semiconductor. The compressed air introduced into the housing often also comes into contact with parts of the heat sink, resulting in a further cooling effect by way of this heat sink. It has proven particularly advantageous to route the supplied compressed air such that this flows along at least parts of the heat sink. Another option is to provide a further heat sink on the power semiconductor through which the depressurized compressed air flows to discharge losses of the power semiconductor to the air in the surroundings of the power semiconductor and to improve the cooling effect.

The method has proven particularly advantageous if the housing adjacent to the power semiconductors has at least one busbar. The busbar, for example with copper bars, is used to electrically contact the power semiconductors. Some of the bars heat up significantly as a result of the currents which flow through the busbar. The busbar is usually attached to one side of the power semiconductor opposite another side of the power semiconductor to which the heat sink is fastened. Thus, it is only possible to cool and/or reduce the heat of the busbar by way of the heat sink with difficulty. For this reason, the busbar is usually not designed with regard to its current carrying capacity but rather the thermal conditions determine the dimensioning of the busbar. By means of the cooling effect of the compressed air supplied to the housing, the busbar can be cooled such that this can be smaller and lighter in design and thus more cost-effective. It has proven particularly advantageous to guide the compressed air supplied to the housing such that this comes into contact with at least parts of the busbar. Due to the high material cost, in particular with the customary use of copper for the solid busbar, with this arrangement high costs can be avoided in the dimensioning of the busbar.

In a further advantageous embodiment, the depressurization device is designed as a pressure-reducing valve. In this way, the pressure of the compressed air removed from the braking system can be easily and cost-effectively reduced to any desired value between the value of the compressed air and that of the environment.

In a further advantageous embodiment, the housing is air-permeable in design. The air-permeable design leads to the housing not being pressure-tight. A construction which is not pressure-tight can be produced in a particularly cost-effective manner. For example, openings are provided in the housing. If power semiconductors, for example the power semiconductors of a power converter for traction or auxiliary operations, are arranged in the housing, the housing has dimensions which make a pressure-tight design considerably more expensive. It has been shown that the advantages of a pressure-tight design with regard to the occurrence of humid air can also be obtained significantly more cost-effectively by means of an increased throughput of compressed air.

In a further advantageous embodiment, the braking system has a main air reservoir line and/or a main air line, wherein the compressed air that can be supplied to the housing can be removed from the main air reservoir line and/or the main air line. An air compressor, the compressor of a rail vehicle, maintains the pressure in the main air reservoir line between 6.5 and 10 bar. It has been shown that the resulting cooling of the compressed air during depressurization by means of the depressurization device leads to a reduction of the air temperature in the interior of the housing which results in a higher performance of the power semiconductors arranged there. Furthermore, the busbar which is connected to the power semiconductors can also be significantly smaller such that, for example, when copper is used for the busbar the costs of the busbar can be reduced significantly in part. Thus, in the rail vehicle in particular, an air pressure of between 6.5 bar and 10 bar lends itself for the removal of compressed air from the braking system. Furthermore, this is a default value for rail vehicles, necessary components such as, for example, pressure-reducing valves, therefore being available at a reasonable price.

The same also applies to the use of compressed air from the main air line. This has compressed air with a pressure in the range of 4 bar to 6 bar. This compressed air is also suitable for drying the air in the housing and/or for cooling components arranged in the housing such as, for example, power semiconductors and/or busbars. Due to the low pressure compared with the main air reservoir line, the cooling effect is reduced but it has proven sufficient for a multiplicity of devices with power semiconductors arranged therein to use the compressed air of the main air line for drying and/or cooling the components arranged in the housing.

In a further advantageous embodiment, a power converter is arranged in the housing. Power converters are usually particularly important for operating the rail vehicle as they are required for operation. The power converter can be a traction power converter for the drive of the rail vehicle or an auxiliary converter for supplying electrical consumers of the rail vehicle. It has therefore proven advisable not only to operate the power semiconductors in the housing with low-humidity air but also to incorporate the entire power converter with its busbars into the housing. Due to the high costs of a power converter, these are rarely designed redundantly. The failure of a power converter in traction frequently causes the complete failure of the rail vehicle. At the least, operation is only possible with limited power. Therefore, when designing and constructing rail vehicles to ensure high availability, special attention is paid to the reliability of this power converter. By operating the power converter or parts of the power converter with low-humidity air obtained by supplying the appropriate amount of compressed air, a significant contribution can be made to high reliability.

BRIEF DESCRIPTION OF THE DRAWINGS

The invention is explained in more detail hereinafter with reference to the exemplary embodiments shown in the diagrams, in which.

DETAILED DESCRIPTION OF PREFERRED EMBODIMENTS

Figure 1:
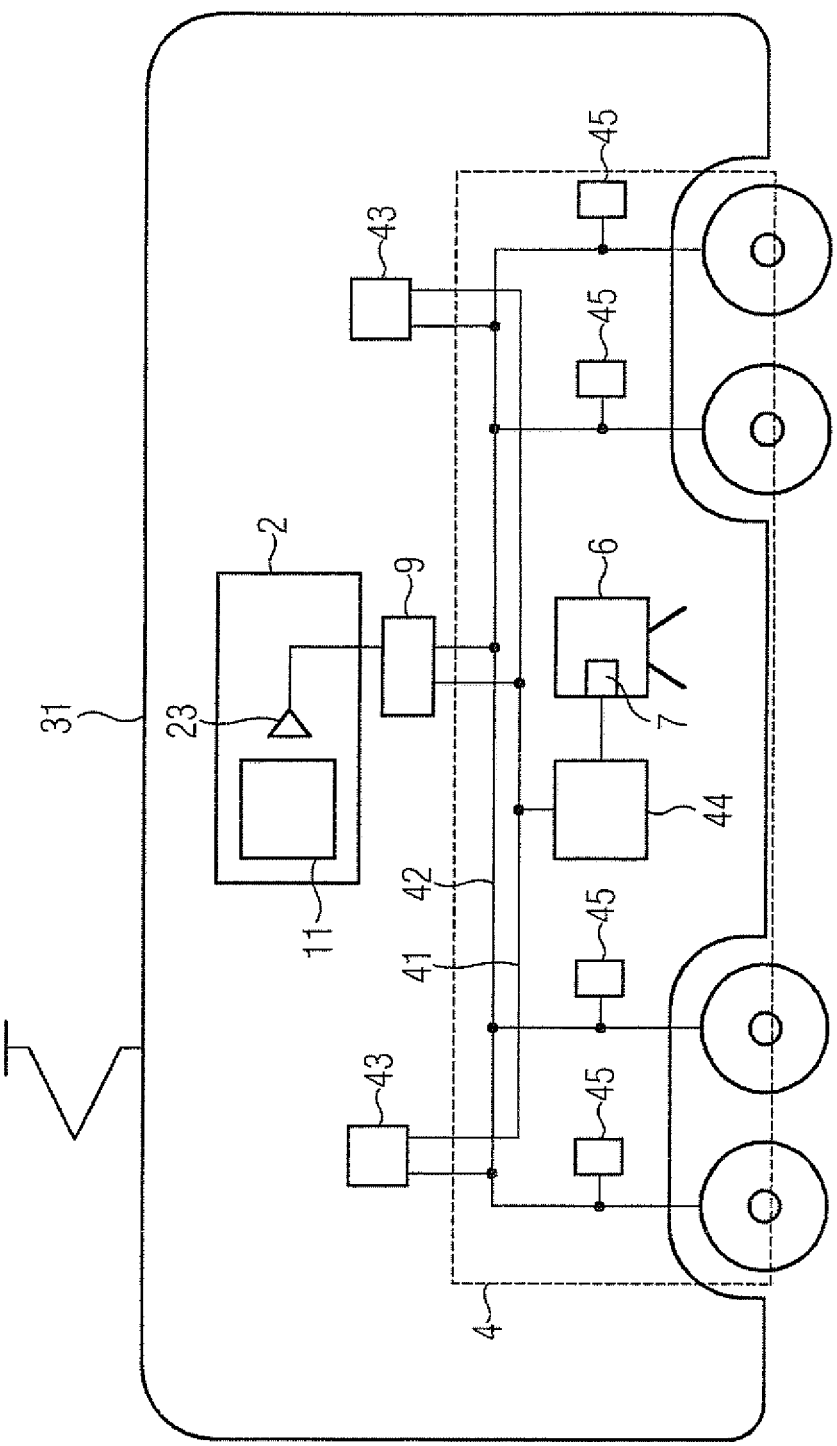
FIG. 1 shows a rail vehicle with a braking system.

FIG. 1 shows a rail vehicle 31 with a diagrammatic view of a braking system 4 and a housing 2 in which power semiconductors 11 are arranged which are to be operated in a dry and/or cool environment.

The braking system comprises a device 6 for generating compressed air 10. A compressor or an air compressor can be used for this purpose. The device 6 for generating compressed air 10 has means 7 for drying compressed air 10. This compressed air 10 is supplied to a main air reservoir 44. This main air reservoir 44 has the task of storing compressed air 10 for the rail vehicle 31. The main air reservoir 44 is connected to the main air reservoir line 41. The main air reservoir line 41 distributes the compressed air 10 throughout the rail vehicle 31. The device 6 for generating compressed air 10 generates a pressure in the main air reservoir line 41 of between 8.5 bar and 10 bar. In older vehicles, the pressure is in the range of 6.5 bar to 8 bar. If the rail vehicle 31 has several cars, the main air reservoir line 41 extends over the entire rail vehicle 31 and its cars. In this way, compressed air 10 is available by way of the main air reservoir line 41 throughout the rail vehicle. Inter alia, the main air reservoir line 41 supplies the brake valves 43 in the driver's cab which are provided for the control of the brakes by the driver. The brakes of the rail vehicle 31 can be controlled with these brake valves 43. In addition to the main air reservoir line 41, the brake valve 43 is also connected to a main air line 42 for this purpose. The main air line 42 is supplied with compressed air 10 by way of the main air reservoir line 41. The pressure of the main air line 42 is 5 bar in an un-braked state. Furthermore, during operation it can also assume values in the range of 4 bar to 6 bar. The pressure in the main air line 42 can be reduced by means of the brake valve 43 whereby braking is initiated on the wheels or axles of the rail vehicle 31. The devices necessary for this such as, for example, brake blocks are not shown in this figure. An auxiliary air reservoir 45 ensures safe braking even with a leak in the main air line 42 or main air reservoir line 41.

Thus, both the main air reservoir line 41 and the main air line 42 are available for the removal of compressed air 10 in the rail vehicle 31. In the exemplary embodiment of FIG. 1 the depressurization device 9 is connected to both the main air reservoir line 41 and the main air line 42. Moreover, it has proven useful to only connect the main air reservoir line 41 or only the main air line 42 to the inlet of the depressurization device 9. The depressurization device 9 is arranged outside the housing 2. This reliably avoids compressed air 10 being supplied to the housing 2 in an uncontrolled manner in the event of a fire inside the housing 2. With the arrangement of the depressurization device 9 outside the housing 2, the actuator for the supply of compressed air 10 is located outside the housing 2. Damage in the event of a fire in the housing 2 and the consequent uncontrolled influx of compressed air 10 can thereby be reliably avoided. The depressurized compressed air 10 enters the interior of the housing 2 from the depressurization device 9 by way of an interface 20 for the supply of compressed air 10 not shown here. The supplied, depressurized compressed air has a low relative humidity. With this, it is possible to reduce the relative humidity of the air in the interior of the housing 2 by displacing air with a higher humidity. Mixing this depressurized compressed air with the existing air in the housing 2 also leads to a reduction in the relative humidity. Furthermore, the supplied, depressurized compressed air 10 has a lower temperature than the air in the interior of the housing 2 which is displaced by the introduction of the depressurized compressed air 10 and/or mixed with it. In this way, it is possible to achieve cooling of components in the interior of the housing 2 such as, for example, power semiconductors 11 or busbars 33. To this end, in the interior of the housing 2 a means 23 of guiding depressurized compressed air 10 is arranged advantageously such that the supplied, depressurized compressed air 10 can be supplied to a power semiconductor 11, a heat sink 32 of the power semiconductor 11 and/or a busbar 33 such that the corresponding compressed air flows along at least partially.

Figure 2:
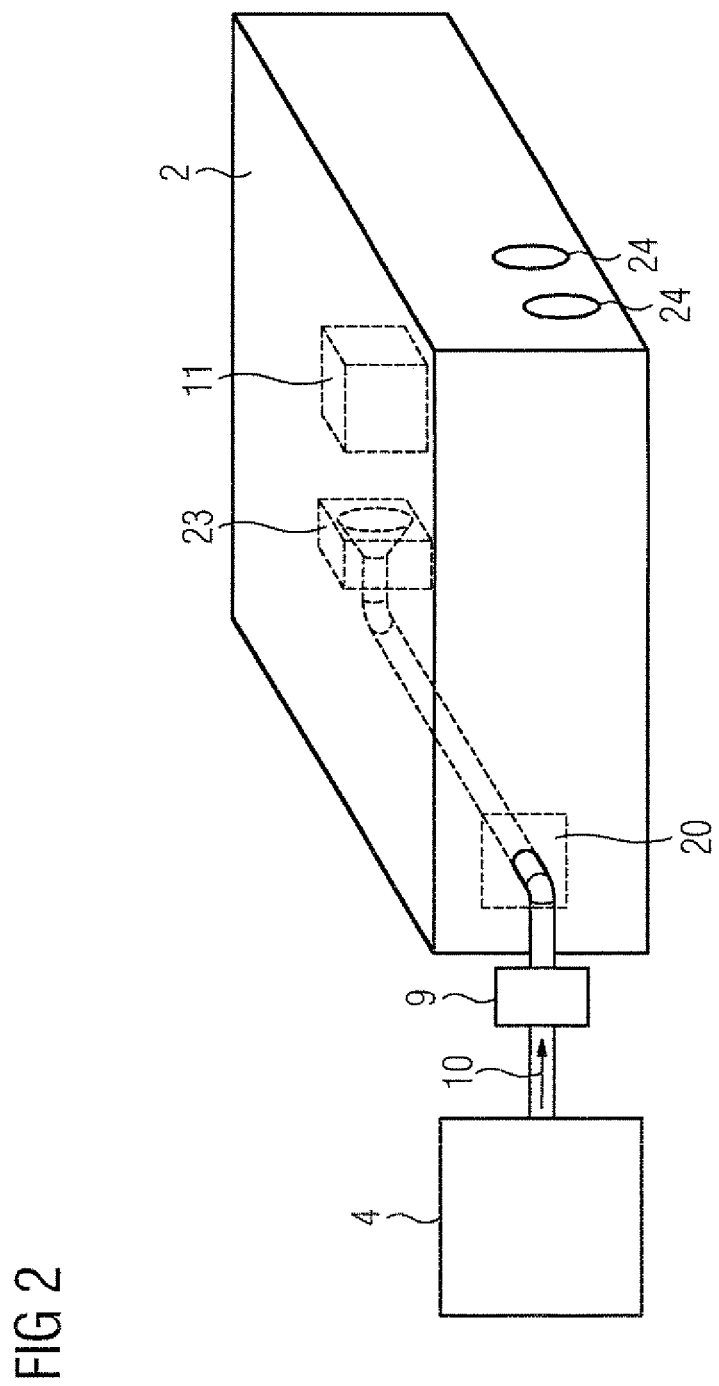
FIG. 2 shows a housing with a power semiconductor.

FIG. 2 shows a housing 2 with a power semiconductor 11. The compressed air 10 for drying and/or cooling components, in particular power semiconductors 11, is removed from the braking system 4 of the rail vehicle 31. For a description of the braking system 4 with its components, in particular, the components guiding the compressed air 10, reference is made to the description for FIG. 1 and the reference characters introduced there. Compressed air 10 is removed from the braking system 4 and supplied to the depressurization device 9. The depressurization device 9 reduces the pressure of the compressed air 10. Depressurized compressed air 10 with a low relative humidity and low temperature is made available in this way. The depressurization device 9 is arranged outside the housing 2 to avoid its being damaged in the event of a fire in the housing 2. An uncontrolled influx of oxygen through the compressed air 10 is thus avoided in the event of a fire. The depressurized compressed air 10 is guided by way of an interface 20 for supplying compressed air 10 to the interior of the housing 2. The depressurized compressed air 10 is guided by a means 23 of guiding depressurized compressed air to a power semiconductor 11, a heat sink 32 and/or a busbar 33. The depressurized compressed air 10 can now ensure that the power semiconductor 11 is operated in an environment with dry air. Furthermore, the power semiconductor 11, a heat sink 32 of the power semiconductor 11 not shown here and/or a busbar 33 not shown here can be cooled by the depressurized compressed air 10 as the supplied compressed air 10 has a low temperature as a result of depressurization.

To avoid an increase in pressure in the interior of the housing 2 when supplying compressed air 10, the housing 2 may have openings 24 in the housing 2.

Figure 3:
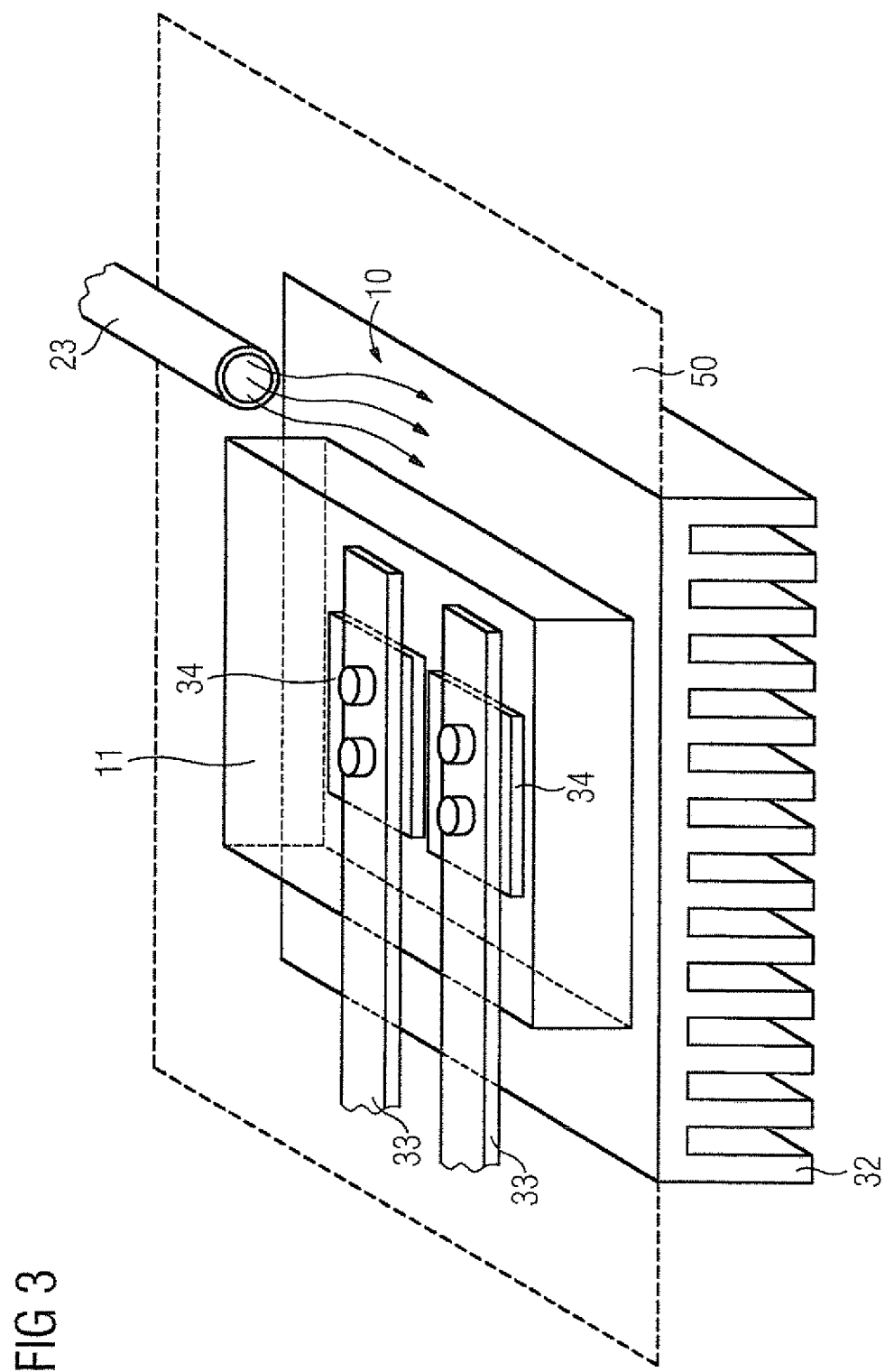
FIG. 3 shows a power semiconductor with heat sink and busbar.

FIG. 3 shows a power semiconductor 11 which is arranged on a heat sink 32. To avoid contamination of the power semiconductor 11, the room through which an airflow with partially contaminated air generated by means of a fan flows is separated from the further room with the power semiconductor 11 by means of a separating wall 50. The contaminated air of the airflow generated by means of the fan cannot reach the power semiconductor 11 through the separating wall 50. The further room in which the power semiconductor 11 and the busbars 33 are arranged is often referred to as a clean room as it is separated from the contaminated air of the environment by means of the separating wall 50. It has proven advantageous to bring the parts of the heat sink 32 which are arranged in the clean room, i.e. are located on the side of the heat sink 32 on which the power semiconductor 11 is arranged, into contact with depressurized compressed air 10. With the aid of the means 23 for guiding depressurized compressed air 10, the depressurized compressed air 10 is guided to the surface of the heat sink 32 such that the compressed air 10 moves along parts of the heat sink 32. Thereby a cooling effect can be achieved for the heat sink and the power semiconductors 11 arranged thereon. Likewise, it is possible alternatively, or in addition, to arrange the means 23 or a further means 23 of guiding depressurized compressed air 10 such that the depressurized compressed air 10 flowing out is directed at a busbar 33 which is connected to the power semiconductor 11 by means of an electrical connection 34. By introducing the cool, depressurized compressed air 10 to at least parts of the busbar 33, these can be cooled such that the busbar 33 can be dimensioned to a smaller size and has a higher current carrying capacity.

For the sake of clarity, only parts of the busbar 33 are shown in this figure.

Although the invention was described and illustrated in more detail by the preferred exemplary embodiments, the invention is not limited to the disclosed example and other variations can be derived therefrom by a person skilled in the art without departing from the scope of the invention.

In conclusion, the invention relates to a rail vehicle having an electric drive with power semiconductors and a braking system operated with compressed air, wherein the power semiconductors are arranged in a housing. To increase the reliability of the rail vehicle it is proposed that the rail vehicle has a depressurization device, wherein the housing and the braking system are interconnected such that the compressed air can be supplied from the braking system to the interior of the housing, wherein the depressurization device is arranged between housing and braking system such that the compressed air that can be supplied to the housing can be depressurized prior to being supplied to the interior of the housing. The invention further relates to a method for operating such a rail vehicle wherein the compressed air is supplied from the braking system to the interior of the housing and wherein the compressed air supplied to the housing is depressurized prior to being supplied to the interior of the housing by means of the depressurization device.

The invention claimed is:

1. A rail vehicle, comprising:
   an electric drive including a housing and power semiconductors arranged in the housing;
   a braking system configured for operation with compressed air, the housing and the braking system being interconnected such as to enable supply of compressed air from the braking system to an interior of the housing to decrease humidity in the housing; and
   a depressurization device arranged between the housing and the braking system such as to enable compressed air which is supplied to the housing to be depressurized prior to being supplied to the interior of the housing.

2. The rail vehicle of claim 1, wherein the housing is configured to guide compressed air such as to flow at least partially along the power semiconductors, a heat sink of the power semiconductor and/or a busbar.

3. The rail vehicle of claim 1, wherein the depressurization device is constructed as a pressure-reducing valve.

4. The rail vehicle of claim 1, wherein the housing is constructed to be air-permeable.

5. The rail vehicle of claim 1, wherein the braking system includes a main air reservoir line and/or a main air line, wherein compressed air supplied to the housing being removable from the main air reservoir line and/or the main air line.

6. The rail vehicle of claim 1, further comprising a power converter arranged in the housing.

7. A method for operating a rail vehicle which includes a braking system configured for operation with compressed air and a housing, said method comprising:
   supplying compressed air from the braking system to an interior of the housing to decrease humidity in the housing; and
   depressurizing the compressed air prior to being supplied to the interior of the housing,
   wherein power semiconductors are arranged in the housing.

8. The method of claim 7, further comprising guiding the compressed air in the interior of the housing such that the compressed air flows at least partially along at least one component selected from the group consisting of the power semiconductors, a heat sink of the power semiconductors and a busbar, for cooling.

9. The method of claim 7, wherein a pressure in the interior of the housing corresponds to an ambient pressure.

10. The method of claim 7, further comprising removing compressed air from a main air reservoir line and/or main air line of the brake system.

* * * * *